US008560713B2

(12) United States Patent
Moreira Sa de Souza et al.

(10) Patent No.: US 8,560,713 B2
(45) Date of Patent: Oct. 15, 2013

(54) METHOD AND SYSTEM FOR MEDIATING ENTERPRISE SERVICE ACCESS FOR SMART DEVICES

(75) Inventors: Luciana Moreira Sa de Souza, Karlsruhe (DE); Stamatis Karnouskos, Karlsruhe (DE); Oliver Baecker, St. Gallen (CH); Domnic Savio, Malschenberg (DE); Patrik Spiess, Karlsruhe (DE)

(73) Assignee: SAP AG, Walldorf (DE)

( * ) Notice: Subject to any disclaimer, the term of this patent is extended or adjusted under 35 U.S.C. 154(b) by 389 days.

(21) Appl. No.: 12/183,976

(22) Filed: Jul. 31, 2008

(65) Prior Publication Data

US 2010/0030881 A1 Feb. 4, 2010

(51) Int. Cl.
*G06F 9/44* (2006.01)

(52) U.S. Cl.
USPC ............................ 709/230; 709/226; 709/250

(58) Field of Classification Search
USPC ............................ 709/230
See application file for complete search history.

(56) References Cited

U.S. PATENT DOCUMENTS

| | | | | |
|---|---|---|---|---|
| 6,868,447 | B1 | 3/2005 | Slaughter et al. | |
| 6,970,869 | B1 | 11/2005 | Slaughter et al. | |
| 7,243,356 | B1 | 7/2007 | Saulpaugh et al. | |
| 7,395,333 | B1 | 7/2008 | Saulpaugh et al. | |
| 7,398,533 | B1 | 7/2008 | Slaughter et al. | |
| 2002/0092000 | A1* | 7/2002 | Srinivasan et al. | 717/136 |
| 2003/0131052 | A1* | 7/2003 | Allan | 709/203 |
| 2004/0205153 | A1* | 10/2004 | Weisshaar et al. | 709/217 |
| 2005/0060393 | A1* | 3/2005 | Parnafes et al. | 709/220 |
| 2005/0152344 | A1* | 7/2005 | Chiu et al. | 370/352 |
| 2005/0213592 | A1* | 9/2005 | Kalish | 370/401 |
| 2006/0184510 | A1* | 8/2006 | Nishio | 707/3 |
| 2007/0115996 | A1* | 5/2007 | Shitano et al. | 370/392 |
| 2007/0124475 | A1* | 5/2007 | Syed et al. | 709/226 |
| 2007/0233881 | A1* | 10/2007 | Nochta et al. | 709/228 |
| 2008/0183800 | A1* | 7/2008 | Herzog et al. | 709/202 |
| 2008/0209438 | A1* | 8/2008 | Jackson et al. | 719/313 |
| 2008/0222315 | A1* | 9/2008 | Maszak et al. | 710/14 |
| 2009/0024705 | A1* | 1/2009 | Rama Rao | 709/206 |
| 2009/0089109 | A1* | 4/2009 | Rabetge et al. | 705/7 |
| 2009/0113077 | A1* | 4/2009 | Dahlen | 709/250 |
| 2009/0144252 | A1* | 6/2009 | Koch et al. | 707/4 |
| 2010/0030880 | A1* | 2/2010 | Joshi et al. | 709/223 |

OTHER PUBLICATIONS

Jammes, F. et al., "Service-Oriented Paradigms in Industrial Automation", IEEE Transactions on Industrial Informatics, vol. 1, No. 1, Feb. 2005, pp. 62-70.

(Continued)

*Primary Examiner* — Hamza Algibhah
(74) *Attorney, Agent, or Firm* — Brake Hughes Bellermann LLP

(57) ABSTRACT

Techniques are described for mediating enterprise service access for smart devices. A first message may be received at an enterprise service proxy device from a smart device via a first protocol associated with the smart device. It may be determined that the first message includes a smart device request for processing via an enterprise service located at a backend device. An enterprise service request and an associated enterprise request protocol may be determined based on the smart device request and a service adaptation description associated with the enterprise service and the first protocol. The enterprise service request may be sent to the backend device via the associated enterprise request protocol.

19 Claims, 13 Drawing Sheets

(56) References Cited

OTHER PUBLICATIONS

Jammes, F. et al., “Service-Oriented Device Communications Using the Devices Profile for Web Services”, Article No. 16, MPAC ’05 (Nov. 28-Dec. 2, 2005), 8 pages.
Bohn, H et al., “SIRENA—Service Infrastructure for Real-time Embedded Networked Devices: A service oriented framework for different domains”, International Conference on Networking, International Conference on Systems and International Conference on Mobile Communications and Learning Technologies, 2006, 6 pages.
Macehiter, N. et al., “Real SOA: critical success factors”, Macehiter Ward-Dutton, Jun. 2005, pp. 1-14.
OASIS, “Web Services Business Process Execution Language Version 2.0”, OASIS Standard, Apr. 11, 2007, 264 pages.
Karnouskos, S. et al., “Integration of SOA-ready Networked Embedded Devices in Enterprise Systems via a Cross-Layered Web Service Infrastructure”, 12th IEEE Conference on Emerging Technologies and Factory Automation, Patras, Greece, Sep. 25-28, 2007, 8 pages.
Cicirelli, F. et al., “A General Brokering Architecture Layer and its Application to Video on-Demand over the Internet”, Informatica, vol. 31, No. 4, 2007, pp. 29-38.
Gorbach, G. “Pursuing Manufacturing Excellence through Real-time Performance Management and Continuous Improvement”, ARC Whitepaper, ARC Advisory Group, Apr. 2006, pp. 1-20.
Gaxiola, L. et al., “Proposal of Holonic Manufacturing Execution Systems Based on Web Service Technologies for Mexican SMEs”, Proceedings of First International Conference on Industrial Applications of Holonic and Multi-Agent Systems, 2003, pp. 156-166.
Saif, U. et al., “Communication Primitives for Ubiquitous Systems or RPC Considered Harmful”, Proceedings of 21st International Conference on Distributed Computing Systems Workshops, 2001, 6 pages.
Zeeb, E. et al., “Service-Oriented Architectures for Embedded Systems Using Devices Profile for Web Services”, 21st International Conference on Advanced Information Networking and Applications Workshops, vol. 1, May 2007, 8 pages.
Schoenberger, C. R., “The Internet of Things”, Forbes.com, Mar. 18, 2002, 2 pages.
Reinhardt, A “A Machine-To-Machine ‘Internet of Things’”, Business Week, Special Report—Wireless Wonders, Apr. 26, 2004, 2 pages.

* cited by examiner

500

```
<?xml version="1.0" encoding="UTF-8" ?>

- <xs:schema xmlns:xs="http://www.w3.org/2001/XMLSchema"
elementFormDefault="qualified" attributeFormDefault="unqualified">
502 - <xs:element name="serviceAdaptationDescription">

- <xs:complexType>
- <xs:sequence>
504 - <xs:element name="version">
- <xs:complexType>
- <xs:sequence>
510   <xs:element name="value" type="xs:string" />
512   <xs:element name="compatibleWith" type="xs:string" minOccurs="0"
maxOccurs="unbounded" />
  </xs:sequence>
  </xs:complexType>
  </xs:element>
506 - <xs:element name="virtualDevices">
- <xs:complexType>
- <xs:sequence>
- <xs:element name="virtualDevice">
- <xs:complexType>
514   <xs:attribute name="id" type="xs:string" />
  </xs:complexType>
  </xs:element>
516 - <xs:element name="deviceType" type="xs:string">

  </xs:element>
  </xs:sequence>
  </xs:complexType>
  </xs:element>
508 - <xs:element name="conversionRules">
- <xs:complexType>
- <xs:sequence>
- <xs:element name="rule" minOccurs="0" maxOccurs="unbounded">
```

FIG. 5a

```
- <xs:element name="conversionRules">
- <xs:complexType>
- <xs:sequence>
- <xs:element name="rule" minOccurs="0"
maxOccurs="unbounded">

- <xs:complexType>
- <xs:sequence>
- <xs:element name="targetEnterpriseService">
- <xs:complexType>
- <xs:sequence>
- <xs:element name="serviceId">

  </xs:element>
  </xs:sequence>
  </xs:complexType>
  </xs:element>
- <xs:element name="targetServiceOperation">
- <xs:complexType>
- <xs:sequence>
- <xs:element name="operationId">

  </xs:element>
  </xs:sequence>
  </xs:complexType>
  </xs:element>
- <xs:element name="virtualDeviceId" type="xs:string">

  </xs:element>
- <xs:element name="parameterMappingRule"
minOccurs="0" maxOccurs="unbounded">
- <xs:complexType>
- <xs:sequence>
- <xs:element name="parameterId" type="xs:string">

  </xs:element>
```

FIG. 5b

```
- <xs:element name="mappingStrategy">
- <xs:complexType>
- <xs:choice>
- <xs:element name="defaultValue">

- <xs:complexType>
- <xs:sequence>
- <xs:element name="value" type="xs:anyType">

  </xs:element>
  </xs:sequence>
  </xs:complexType>
  </xs:element>
- <xs:element name="localFormula" type="xs:string">

  </xs:element>
- <xs:element name="remoteFormula" type="xs:string">

  </xs:element>
- <xs:element name="directMapping">

- <xs:complexType>
- <xs:sequence>
- <xs:element name="targetParamName" type="xs:string">

  </xs:element>
  </xs:sequence>
</xs:complexType>
  </xs:element>
  </xs:choice>
  </xs:complexType>
  </xs:element>
  </xs:sequence>
  </xs:complexType>
  </xs:element>
```

```
526 - <xs:element name="accessPolicy" minOccurs="0">

- <xs:complexType>
- <xs:sequence>
534 - <xs:element name="requiredLevelOfAuthentication" minOccurs="0">
- <xs:complexType>
- <xs:choice>
- <xs:element name="none">

  </xs:element>
- <xs:element name="commonSecret">

  </xs:element>
- <xs:element name="individualAuthentication">

  </xs:element>
  </xs:choice>
  </xs:complexType>
  </xs:element>
536 - <xs:element name="requiredLevelOfEncryption" minOccurs="0">
- <xs:complexType>
- <xs:choice>
  <xs:element name="none" />
- <xs:element name="algorithm">
- <xs:complexType>
- <xs:sequence>
  <xs:element name="algorithmId" type="xs:anySimpleType" />
  <xs:element name="requiredKeyLength" />
  </xs:sequence>
  </xs:complexType>
  </xs:element>
  </xs:choice>
  </xs:complexType>
  </xs:element>
  </xs:sequence>
  </xs:complexType>
</xs:element>
```

FIG. 5d

```
    - <xs:element name="errorCompensationStrategies" minOccurs="0">
528 - <xs:complexType>
    - <xs:sequence>
    - <xs:element name="backEndErrorMessage" maxOccurs="unbounded">
540 - <xs:complexType>
    - <xs:sequence>
        <xs:element name="lowLevelCompensationStrategy" type="xs:anyType"
538 maxOccurs="unbounded" />
      </xs:sequence>
      </xs:complexType>
      </xs:element>
      </xs:sequence>
      </xs:complexType>
      </xs:element>
      </xs:sequence>
      </xs:complexType>
      </xs:element>
      </xs:sequence>
      </xs:complexType>
      </xs:element>
      </xs:sequence>
      </xs:complexType>
      </xs:element>
      </xs:schema>
```

```
<?xml version="1.0" encoding="UTF-8" ?>
- <serviceAdaptationDescription
xsi:noNamespaceSchemaLocation="serviceAdaptionDescription2.xsd"
xmlns:xsi="http://www.w3.org/2001/XMLSchema-instance">
- <version>
  <value>1.1</value>
  <compatibleWith>1.0</compatibleWith>
  </version>
- <virtualDevices>
  <virtualDevice id="10.24.98.103" />
  <deviceType>DPWS</deviceType>
  </virtualDevices>
- <conversionRules>
- <rule>
- <targetEnterpriseService>
  <serviceId>GoodsReceipt</serviceId>
  </targetEnterpriseService>
- <targetServiceOperation>
  <operationId>compareEPCwithShipment</operationId>
  </targetServiceOperation>
  <virtualDeviceId>10.24.98.103</virtualDeviceId>
- <parameterMappingRule>
  <parameterId>EPC_enterprise</parameterId>
- <mappingStrategy>
- <directMapping>
  <targetParamName>EPC</targetParamName>
  </directMapping>
  </mappingStrategy>
  </parameterMappingRule>
- <parameterMappingRule>
  <parameterId>ReaderID_enterprise</parameterId>
- <mappingStrategy>
- <directMapping>
  <targetParamName>ReaderID</targetParamName>
  </directMapping>
  </mappingStrategy>
  </parameterMappingRule>
```

```
- <parameterMappingRule>
  <parameterId>shipment number</parameterId>
- <mappingStrategy>
  <remoteFormula>indicates formula for retrieving the shipment number of
        the expected shipment from an external service</remoteFormula>
  </mappingStrategy>
  </parameterMappingRule>
- <parameterMappingRule>
  <parameterId>Date</parameterId>
- <mappingStrategy>
- <defaultValue>
  <value date="java.util.Date.getDate()" />
  </defaultValue>
  </mappingStrategy>
  </parameterMappingRule>
- <accessPolicy>
- <requiredLevelOfAuthentication>
  <commonSecret />
  </requiredLevelOfAuthentication>
- <requiredLevelOfEncryption>
  <none />
  </requiredLevelOfEncryption>
  </accessPolicy>
- <errorCompensationStrategies>
- <backEndErrorMessage>
  <lowLevelCompensationStrategy>retry</lowLevelCompensationStrategy>
  </backEndErrorMessage>
  </errorCompensationStrategies>
  </rule>
  </conversionRules>
  </serviceAdaptationDescription>
```

FIG. 8b

METHOD AND SYSTEM FOR MEDIATING ENTERPRISE SERVICE ACCESS FOR SMART DEVICES

TECHNICAL FIELD

This description relates to techniques for mediating enterprise service access for smart devices.

BACKGROUND

With the growth of activity involving smart devices which are interconnected through networks such as the Internet, many techniques are being developed for executing processes such as business processes. Although client-server architectures continue to play an important role, for example, in the field of business software systems, Service Oriented Architectures (SOAs) are becoming increasingly more popular. The integration of devices into a business landscape through SOA is an example approach for digitalizing physical objects and for making them available to systems, for example, by running instances of web services on these devices.

Enterprise backend devices such as enterprise backend servers may provide access to enterprise services, which may include, for example, web services that may provide services that may be desirable for low level smart devices such as devices on a shop floor or devices associated with an energy distribution domain.

However, smart devices included in a device level in many architectures may have limited processing capabilities, and thus it may be difficult for the smart devices to access and utilize enterprise services, for example, available on backend devices such as backend servers. For example, the enterprise services may include complex web services that may be accessed via standardized protocols that may be different from the communication protocols utilized by the smart devices in their respective typical communications. Thus, it may be desirable to provide techniques for mediating enterprise service access for smart devices.

SUMMARY

According to one general aspect, a system includes an enterprise service access mediator including an enterprise service proxy device that includes a virtual proxy device and a service adaptor. The virtual proxy device may include a mediating receiver configured to receive a first message from a smart device via a first protocol associated with the smart device, a parser configured to determine that the first message includes a smart device request for processing via an enterprise service located at a backend device, and a mediating converter configured to determine an enterprise service request and an associated enterprise request protocol based on the smart device request and a service adaptation description associated with the enterprise service and the first protocol. The service adaptor may be configured to send the enterprise service request to the backend device via the associated enterprise request protocol.

According to another aspect, a method includes receiving a first message at an enterprise service proxy device from a smart device via a first protocol associated with the smart device. It may be determined that the first message includes a smart device request for processing via an enterprise service located at a backend device. An enterprise service request and an associated enterprise request protocol may be determined based on the smart device request and a service adaptation description associated with the enterprise service and the first protocol. The enterprise service request may be sent to the backend device via the associated enterprise request protocol.

According to yet another aspect, a computer program product is tangibly embodied on a computer-readable medium and is configured to cause a data processing apparatus to receive a first message at an enterprise service proxy device from a smart device via a first protocol associated with the smart device, determine that the first message includes a smart device request for processing via an enterprise service located at a backend device, determine an enterprise service request and an associated enterprise request protocol based on the smart device request and a service adaptation description associated with the enterprise service and the first protocol, and send the enterprise service request to the backend device via the associated enterprise request protocol.

The details of one or more implementations are set forth in the accompanying drawings and the description below. Other features will be apparent from the description and drawings, and from the claims.

BRIEF DESCRIPTION OF THE DRAWINGS

FIGS. 5*a*-5*e* depict an example service adaptation description in accordance with an eXtensible Markup Language (XML) schema format.

FIGS. 8*a*-8*b* depict an example service adaptation description in accordance with an eXtensible Markup Language (XML) format.

DETAILED DESCRIPTION

Figure 1:
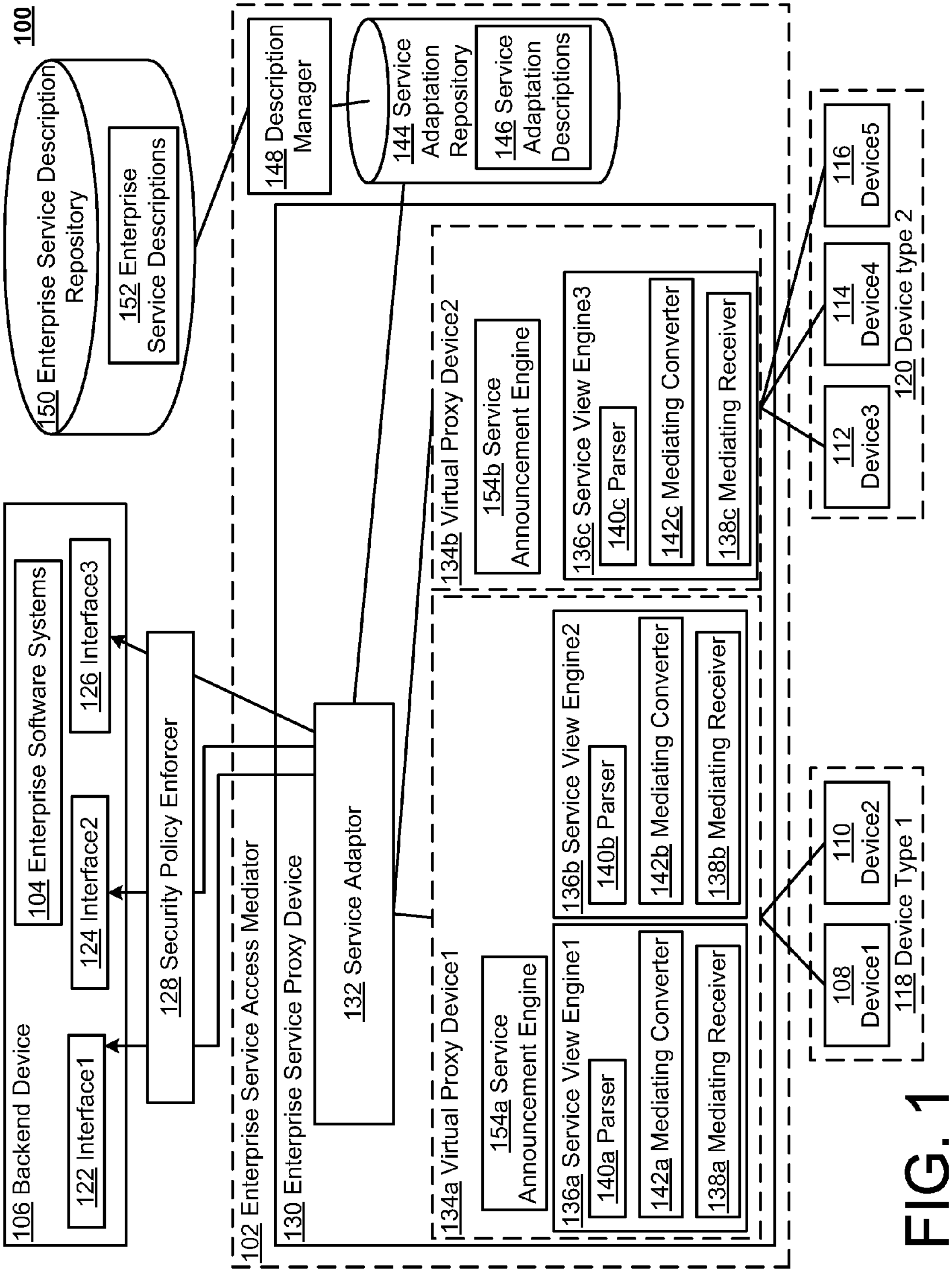
FIG. 1 is a block diagram of a system for mediating enterprise service access for smart devices according to an example embodiment.

FIG. 1 is a block diagram of a system 100 for mediating enterprise service access for smart devices. In the example of FIG. 1, an enterprise service access mediator 102 includes various processing engines that mediate enterprise service access between one or more enterprise software systems 104 located at a backend device 106 and one or more smart devices shown, for example, in FIG. 1 as devices 108, 110, 112, 114, 116. For example, the backend device 106 may include one or more servers (e.g., backends or backend servers). For example, the backend device 106 may include one or more backend servers configured to execute enterprise software systems or enterprise services.

According to an example embodiment, each smart device 108, 110, 112, 114, 116 may include a device with communication capabilities. In this context, a smart device includes any physical object that has an embedded or attached system having one or more storage resources such as memory (e.g., volatile RAM, persistent ROM, a pattern of randomly distributed metal fibers, etc.), and at least one communication resource (e.g., a serial link, a Universal Serial Bus (USB)

connection, Ethernet or IP connectivity, a Bluetooth or an IEEE 802.15.4 radio, or other communication means). With such resources, the smart device may communicate with other smart devices and other systems that may feature the same or similar communication techniques. In addition to these resources, a smart device may include one or more sensors, actuators, displays, or other facilities to monitor or affect its internal state or its environment. The smart device may further include computational resources (e.g., a microprocessor, hard wired logic, a signal processor, etc.).

Examples of smart devices may include radio frequency identification (RFID)-tagged items, RFID readers, production machines, smart power meters, wireless sensor nodes, programmable logic controllers, telephones, vehicles, robots, mobile phones, etc.

According to an example embodiment, each of the smart devices 108, 110, 112, 114, 116 may include one or more of an embedded device, a radio frequency identification (RFID) reader, an RFID-tagged item, a smart items device, a device within a sensor network, a sensor mote, a product embedded information device, a shop floor device, a personal digital assistant (PDA), a personal computer, a portable computer, a wireless telephone, a power regulation device, a monitoring device, a production machine, a smart power meter, a wireless sensor node, a programmable logic controller, a telephone, a vehicle, a robot, a mobile phone, or a product control device. According to an example embodiment, each smart device 108, 110, 112, 114, 116 may include a smart device having a capability to connect to a gateway.

As an example scenario, a business may wish to track goods via RFID. For example, as part of business operations, produced goods may arrive in a warehouse. Cartons which contain the goods may be tagged via RFID. Upon entering the warehouse, the RFID tags may be read, for example, by handheld terminals operated by personnel associated with transporting the goods. The read tag information may then be sent to an adaptation processor, which may match the tag ID and the receipt information. Details of the receipt may be obtained based on this information, such as a description of goods, quantity and inventory details and other parameters, which may be sent to the backend device 106 for processing.

As shown in FIG. 1, the devices 108 and 110 may be associated with a common device type, which is shown in FIG. 1 as a device type1 118. Similarly, the devices 112, 114, and 116 may be associated with another common device type, which is shown in FIG. 1 as a device type2 120. For example, each of the devices 108, 110, 112, 114, 116 may be configured to communicate with other entities, for example, with other devices, via a particular protocol. For example, the communication protocol may include a proprietary protocol, or it may include a standardized protocol. For example, the devices 108 and 110 may be configured to communicate via a first type of communication protocol associated with the device type1 118, and the devices 112, 114, and 116 may be configured to configured to communicate via a second type of communication protocol associated with the device type2 120.

The enterprise software systems 104 may include one or more enterprise services (not shown) which may be accessed to perform various processing requests, and which may return a result of the processing for a requester associated with the processing request. For example, the enterprise services may be configured to perform processing that is not easily obtained locally to one or more of the devices 108, 110, 112, 114, 116, and thus it may be desirable for one or more of the devices 108, 110, 112, 114, 116 to access one or more of the enterprise services to obtain such processing.

For example, the backend device 106 may include a backend server, which may include enterprise services that may be accessible to entities located externally to the backend server. For example, the backend device 106 may include a single hardware device, or may include a plurality of hardware devices. For example, the backend device 106 may include a single backend server, or may include a plurality of backend servers. For example, the backend device 106 may include a single backend server configured to execute one or more enterprise services, or may include a plurality of backend servers configured to execute enterprise services. For example, the backend device 106 may include functionality that may be distributed over a plurality of hardware devices. For example, the backend device 106 may include one or more distributed systems that are distributed over a plurality of hardware devices communicating via one or more networks and/or local connections. For example, the enterprise services may be accessible via one or more interfaces 122, 124, and 126. For example, the interface 122 may be configured to receive/send messages via a web service interface, the interface 124 may be configured to receive/send messages via a Business Application Programming Interface (BAPI), and the interface 126 may be configured to receive/send messages via a Remote Function Call (RFC) interface. Further, the system 100 may include a security policy enforcer 128 that may be configured to enforce predetermined rules associated with access to the enterprise services.

One skilled in the art of data processing will appreciate that there may be many types of enterprise services that may be configured to process many types of requests, and that some types of processing may not return a result of the processing to an entity located externally to the backend device 106, while other types of processing may return a result to one or more entities which may be located externally and/or internally to the backend device 106, and which may or may not include an originating requester associated with the processing request.

Further, one skilled in the art of data processing will appreciate that various embodiments discussed herein may be combined to advantageously provide additional techniques within the spirit of the present discussion.

The enterprise service access mediator 102 may include an enterprise service proxy device 130 including a service adaptor 132 and one or more virtual proxy devices 134*a*, 134*b*. According to an example embodiment, each of the virtual proxy devices 134*a*, 134*b* may include an emulation of one of the smart devices communicating with other smart devices via the first protocol, wherein the first protocol may include a proprietary protocol. Each of the virtual proxy devices 134*a*, 134*b* may respectively include one or more service view engines 136*a*, 136*b*, 136*c*. Each of the service view engines 136*a*, 136*b*, 136*c* may respectively include a mediating receiver 138*a*, 138*b*, 138*c*, a parser 140*a*, 140*b*, 140*c*, and a mediating converter 142*a*, 142*b*, 142*c*.

Each mediating receiver 138*a*, 138*b*, 138*c* may be configured to receive a first message from a smart device via a first protocol associated with the smart device. For example, the mediating receiver 138*a* may receive a message from the smart device 108 via a proprietary protocol associated with the device type 118. For example, the smart device 108 may be located on a shop floor, and may request access to an enterprise service located on the backend device 106 via the proprietary protocol associated with the device type 118. According to an example embodiment, the mediating receiver 138*a* may be configured to communicate with the smart device 108 via the proprietary protocol associated with the device type 118 such that the smart device 108 is not aware that one or more different protocols may be used by the enterprise service proxy device 130 for communications with entities other than the smart device 108 (e.g., the smart device 108 may be unaware that the enterprise service proxy device 130 may not be a smart device similar to itself). Thus, the smart device 108 may not need to perform extensive processing activity as may be otherwise required to communicate directly with the backend device 106 for requesting access to one or more enterprise services.

Each parser 140*a*, 140*b*, 140*c* may be configured to determine that the first message includes a smart device request for processing via an enterprise service located at a backend device. For example, the parser 140*a* may parse a message received from the smart device 108 to determine that the message includes a request for processing via an enterprise service located at the backend device 106. For example, the request may be formatted in accordance with the protocol associated with the device type 118, and may include a request for an enterprise service that may be accessed at the backend device 106 via a different protocol (e.g., via a web service interface, a BAPI, or an RFC interface as discussed above).

According to an example embodiment, the enterprise service access mediator 102 may include a service adaptation repository 144 that may be configured to store at least one service adaptation description 146. According to an example embodiment, each of the service adaptation descriptions 146 may include information describing enterprise services associated with the backend device. According to an example embodiment, each of the service adaptation descriptions 146 may include information associated with conversion between messages associated with the first protocol and messages associated with one or more of the enterprise services.

Each mediating converter 142*a*, 142*b*, 142*c* may be configured to determine an enterprise service request and an associated enterprise request protocol based on the smart device request and a service adaptation description associated with the enterprise service and the first protocol. For example, the mediating converter 142*a* may determine an enterprise service request and an associated enterprise request protocol (e.g., a web service protocol) based on the smart device request determined by the parser 140*a*, and on a service adaptation description 146 that may be stored in the service adaptation repository 144. According to an example embodiment, each mediating converter 142*a*, 142*b*, 142*c* may be configured to determine the enterprise service request based on translating the smart device request to obtain the enterprise service request based on a mapping included in the service adaptation description associated with the enterprise service and the first protocol. According to an example embodiment, the mapping may include an eXtensible Markup Language (XML) mapping that includes an indication of a first term associated with the smart device request and an indication of a second term associated with the enterprise service request via translation from the smart device request to the enterprise service request.

According to an example embodiment, each mediating converter 142*a*, 142*b*, 142*c* may be configured to determine the enterprise service request based on obtaining at least one parameter associated with the enterprise service request based on the service adaptation description associated with the enterprise service and the first protocol. For example, an enterprise service may be configured to require one or more parameters for satisfaction of a call to the enterprise service. For example, the enterprise service may be configured to process parameters formatted in accordance with a predetermined format (e.g., integer format, floating point format, character format, special character format, access format, security constraints). According to an example embodiment, one or more of the service adaptation descriptions 146 may include information associated with one or more parameters that may be included in an enterprise service request before transmission to the backend device 106 (e.g., via one of the interfaces 122, 124, or 126 as discussed above). According to an example embodiment, each mediating converter 142*a*, 142*b*, 142*c* may be configured to send the enterprise service request to the service adaptor 132 in accordance with a protocol associated with the service adaptor 132.

According to an example embodiment, the service adaptor 132 may be configured to send the enterprise service request to the backend device 106 via the associated enterprise request protocol. According to an example embodiment, the service adaptor 132 may be configured to request verification of a permission to access the enterprise service based on the service adaptation description associated with the enterprise service and the first protocol. For example, the service adaptor 132 may be configured to request verification of the permission to access the enterprise service via the security policy enforcer 128.

According to an example embodiment, the service adaptor 132 may be configured to generate the virtual proxy devices 134*a*, 134*b* based on the protocols associated with the smart devices 108, 110, 112, 114, 116 and the service adaptation descriptions 146. According to an example embodiment, the service adaptor 132 may be configured to generate the service view engines 136*a*, 136*b*, 136*c*. According to an example embodiment, the service adaptor 132 may be configured to obtain one or more protocol conversion rules based on one of the service adaptation descriptions 146 and to compile the virtual proxy device 134*a* and a service view engine 136*a* including the mediating receiver 138*a*, parser 140*a*, and mediating converter 142*a* based on the more protocol conversion rules and the one service adaptation description 146.

According to an example embodiment, the service adaptor 132 may be configured to receive a response message from the backend device 106 via the enterprise request protocol. According to an example embodiment, the service adaptor 132 may be configured to determine a virtual proxy device 134*a*, 134*b* for processing the response message and forwarding the response message to the appropriate smart device 108, 110, 112, 114, 116. According to an example embodiment, each virtual proxy device 134*a*, 134*b* may be configured to determine the service view engine 136*a*, 136*b*, 136*c* to handle forwarding the response message to the appropriate smart device 108, 110, 112, 114, 116. According to an example embodiment, each service view engine 136*a*, 136*b*, 136*c* may be configured to determine a smart device response based on the response message and the service adaptation description. For example, each parser 140*a*, 140*b*, 140*c* may be configured to parse the response message to determine the smart device response. According to an example embodiment, each service view engine 136*a*, 136*b*, 136*c* may be configured to send a second message including the smart device response from the enterprise service proxy device to the smart device via the first protocol.

According to an example embodiment, the system 100 may include an enterprise service description repository 150 that may be configured to store one or more enterprise service descriptions 152. According to an example embodiment, each of the enterprise service descriptions 152 may include information associated with accessing the enterprise services associated with the backend device 106 (e.g., access protocol, parameters, description of service).

According to an example embodiment, the enterprise service access mediator 102 may include a description manager 148. According to an example embodiment, the system 100 may include an enterprise service description repository 150 that may be configured to store one or more enterprise service descriptions 152. According to an example embodiment, each of the enterprise service descriptions 152 may include information describing enterprise services associated with the backend device 106. According to an example embodiment, each of the enterprise service descriptions 152 may include information associated with accessing the enterprise services associated with the backend device 106 (e.g., access protocol, parameters, description of service).

According to an example embodiment, the description manager 148 may be configured to generate the one or more service adaptation descriptions 146 based on one or more of the enterprise service descriptions 152. According to an example embodiment, a user may provide input to the description manager 148 with regard to the mappings between the information included in enterprise service descriptions and information associated with the protocols associated with the smart devices 108, 110, 112, 114, 116. According to an example embodiment, such mappings may be included in the service adaptation descriptions 146 stored in the service adaptation repository 144.

According to an example embodiment, the service adaptation descriptions 146 may include mapping information for every hardware platform that is available in the system 100. Thus, for every available hardware platform associated with the system 100, a mapping may be specified for a service that is understood by a device operating via that platform, and may map that service to whatever protocol is associated with an enterprise application.

According to an example embodiment, certain parameters may be configured by the enterprise service proxy device 130 to access backend enterprise services, as, for example, smart devices may not include a capability to provide access credentials to access backend enterprise service systems. According to an example embodiment, the enterprise service proxy device 130 may map service parameters from the device or smart device level to the enterprise level. Thus, the service adaptation descriptions 146 may provide a formalization of mappings from one level to the other (e.g., a mapping of each word to another word in the translation).

According to an example embodiment, each virtual proxy device 134*a*, 134*b* may include a respective service announcement engine 154*a*, 154*b* that may be configured to send a message to the smart devices 108, 110, 112, 114, 116 indicating an availability of at least one enterprise service for mediated access by the smart device. For example, if availability to an enterprise service is newly added to the virtual proxy device 134*a*, then the service announcement engine 154*a* may send an announcement to the smart devices 108, 110 to inform them that the newly added enterprise service may be accessed by the smart devices 108, 110 via messages sent to the virtual proxy device 134*a*. According to an example embodiment, the announcement may include information for use by the smart devices 108, 110 to generate requests for the newly added enterprise service via the virtual proxy device 134*a*.

According to an example embodiment, a web service may include a software system designed to support interoperable machine-to-machine interaction over a network. For example, a web service may include a Web Application Programming Interface (API) that may be accessed over a network, such as the Internet, and executed on a remote system hosting the requested service(s). Smart devices such as one or more of the devices 108, 110, 112, 114, 116 may be configured to handle web services among themselves, but the processing may become burdensome when extensive processing may be needed for a particular processing need. Enterprise services that may be hosted via a backend server may offer availability of a variety of services, and may be accessed via protocols that may include standardized protocols; however, smart devices may be configured to communicate via proprietary protocols, or via protocols that may be different from the protocols used for accessing particular enterprise services. The smart device may need to perform substantial processing to communicate directly with a backend server to access such enterprise services. Further, there may be security constraints imposed by the backend server on requests for enterprise service processing by external entities. Thus, the smart device may need to perform additional processing in order to clear security enforcers associated with the backend server. For example, the backend server may provide only limited access to particular enterprise services.

The example enterprise service access mediator 102 discussed herein may provide access to backend enterprise services for smart devices without requiring the smart devices to generate requests for enterprise services formatted in accordance with the particular protocol that may be associated with the enterprise services. For example, the smart devices 108, 110, 112, 114, 116 may communicate with the virtual proxy devices 134*a*, 134*b* via default parameters associated with the communication protocol used by the smart devices in communications with other smart devices. Thus, access to protocols of backend enterprise services is simplified for the smart devices, as no conversion is required of the smart device itself in order to access the enterprise services. According to an example embodiment, such access may provide a means of bringing down the functionality of a backend system to the device level (e.g., on a shop floor, mobile devices), in a form that is easily understood by the devices or smart devices.

Further, the example enterprise service access mediator 102 discussed herein may provide a communication means for returning result information or other information from the backend device 106 to the smart device 108, 110, 112, 114, 116, alleviating the need for the enterprise services or the backend device 106 to format the information in accordance with the protocol associated with the smart device.

Figure 2:
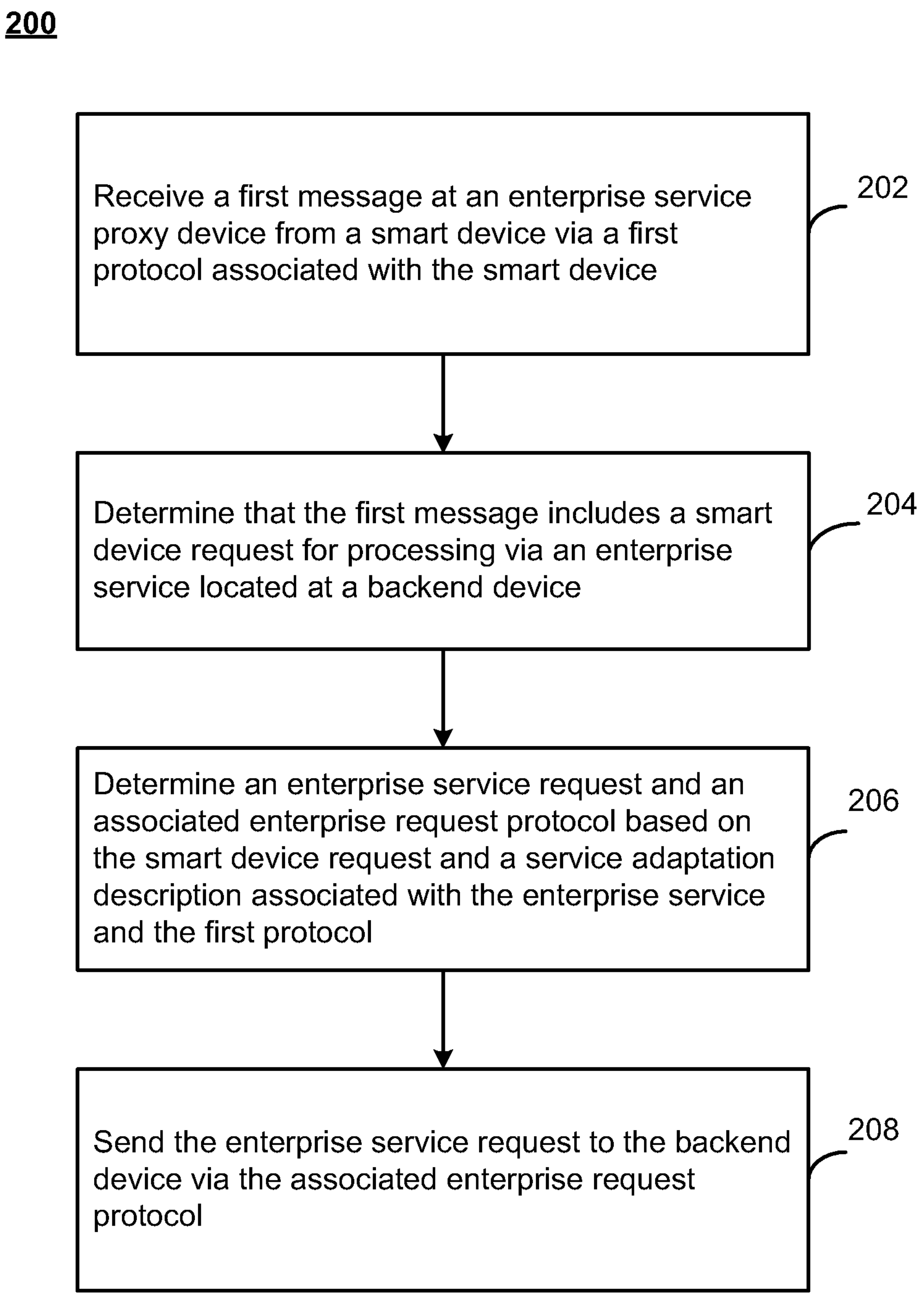
FIG. 2 is a flowchart illustrating an operation of the example system of FIG. 1.

FIG. 2 is a flowchart illustrating an example operation of the system of FIG. 1. At 202, a first message may be received at an enterprise service proxy device from a smart device via a first protocol associated with the smart device. For example, the first message may be received at the enterprise service proxy device 130 from a smart device (e.g., one of the smart devices 108, 110, 112, 114, 116) via a first protocol associated with the smart device, as discussed above. For example, the first protocol may include a proprietary protocol associated with the smart device. For example, the mediating receiver 138*a* may receive a message from the smart device 108 via a proprietary protocol associated with the device type 118. According to an example embodiment, the first message may be received at a virtual proxy device from an embedded device via a proprietary protocol associated with the embedded device. According to an example embodiment, the virtual proxy device may include an emulation of another embedded device communicating with other embedded devices via the proprietary protocol.

At 204, it may be determined that the first message may include a smart device request for processing via an enterprise service located at a backend device. For example, the parser 140*a* may parse a message received from the smart device 108 to determine that the message includes a request for processing via an enterprise service located at the backend device 106, as discussed above.

According to an example embodiment, determining that the first message includes a smart device request may include parsing the first message at the enterprise service proxy device to obtain the smart device request for processing via the enterprise service located at the backend server.

At 206, an enterprise service request and an associated enterprise request protocol may be determined based on the smart device request and a service adaptation description associated with the enterprise service and the first protocol. For example, the mediating converter 142*a* may determine an enterprise service request and an associated enterprise request protocol (e.g., a web service protocol) based on the smart device request determined by the parser 140*a*, and on a service adaptation description that may be stored in the service adaptation repository 144, as discussed above.

According to an example embodiment, determining the enterprise service request may include translating the smart device request to obtain the enterprise service request based on a mapping included in the service adaptation description associated with the enterprise service and the first protocol.

According to an example embodiment, determining the enterprise service request may include translating the smart device request to obtain the enterprise service request based on an eXtensible Markup Language (XML) mapping included in the service adaptation description associated with the enterprise service and the first protocol, wherein the XML mapping may include an indication of a first term associated with the smart device request and an indication of a second term associated with the enterprise service request via translation from the smart device request to the enterprise service request.

According to an example embodiment, determining the enterprise service request may include obtaining at least one parameter associated with the enterprise service request based on the service adaptation description associated with the enterprise service and the first protocol.

At 208, the enterprise service request may be sent to the backend device via the associated enterprise request protocol. According to an example embodiment, the service adaptor 132 may be configured to send the enterprise service request to the backend device 106 via the associated enterprise request protocol, as discussed above. According to an example embodiment, sending the enterprise service request to the backend device via the associated enterprise request protocol may include verifying a permission to access the enterprise service based on the service adaptation description associated with the enterprise service and the first protocol. According to an example embodiment, the service adaptor 132 may be configured to verify the permission to access the enterprise service via the security policy enforcer 128, as discussed above.

According to an example embodiment, sending the enterprise service request may include sending the enterprise service request to a backend device interface based on the associated enterprise request protocol. According to an example embodiment, the associated enterprise request protocol may include one or more of a web service interface, a Business Application Programming Interface (BAPI), or a Remote Function Call (RFC) interface.

According to an example embodiment, sending the enterprise service request may include requesting verification of a permission to access the enterprise service based on the service adaptation description associated with the enterprise service and the first protocol. For example, the service adaptor 132 may request verification of a permission via the security policy enforcer 128, as discussed above.

According to an example embodiment, the method may further include receiving a response message from the backend device via the enterprise request protocol. According to an example embodiment, the method may further include determining a smart device response based on the response message and the service adaptation description. According to an example embodiment, the method may further include sending a second message including the smart device response from the enterprise service proxy device to the smart device via the first protocol.

Figure 3:
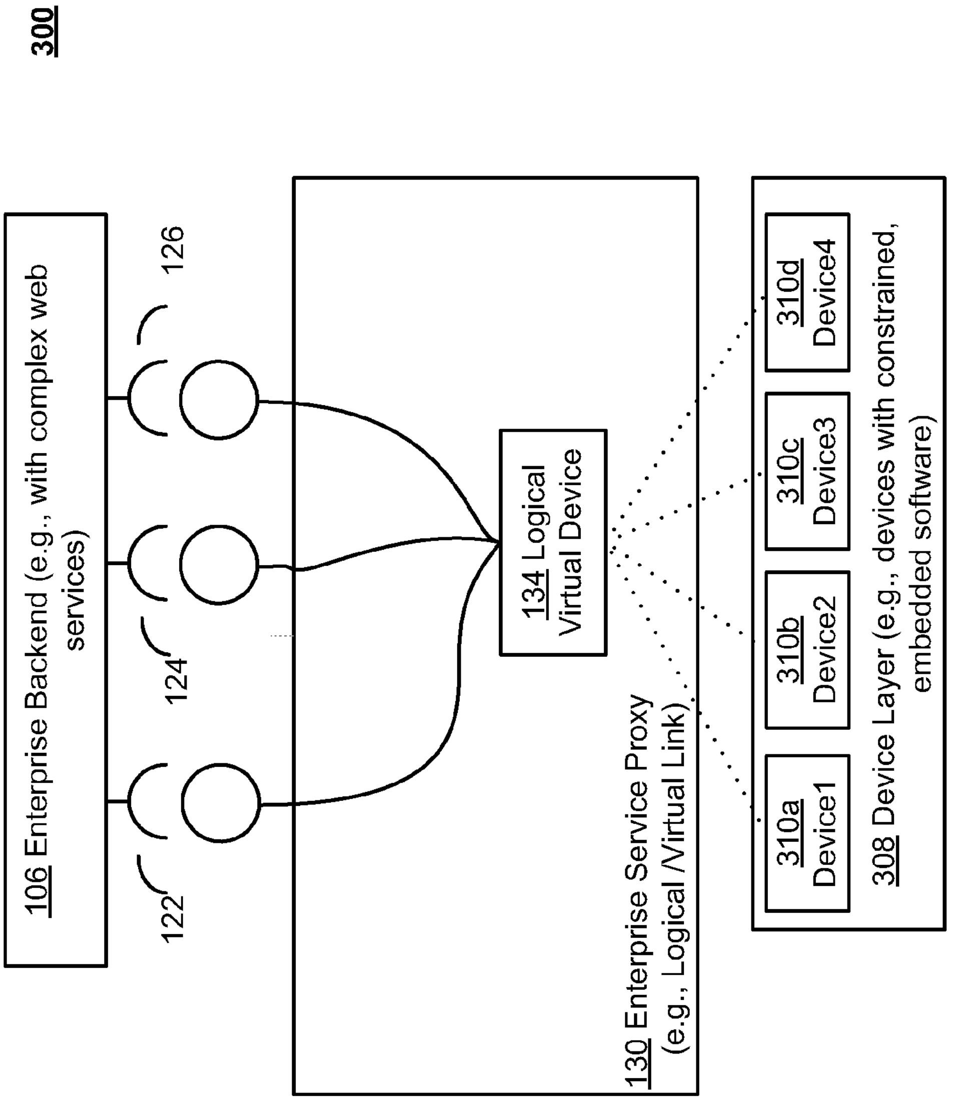
FIG. 3 depicts a system for mediating enterprise service access for smart devices according to an example embodiment.

FIG. 3 depicts a system 300 for mediating enterprise service access for smart devices according to an example embodiment. The diagram blocks are numbered to indicate system components similar to the components discussed above with regard to FIG. 1. For example, the enterprise backend 106 may be configured similarly to the backend device 106 discussed above. As shown in FIG. 3, the example enterprise backend 106 may host complex web services. For example, the functionality of the complex web services may be desirable to a smart device, but may require a substantial amount of processing by the smart device to access the complex web services directly from the enterprise backend 106. Additionally, a device layer 308 may include devices 310*a*, 310*b*, 310*c*, 310*d*, similar to the smart devices 108, 110, 112, 114, 116 as described above. As shown in FIG. 3, the device layer 308 may include devices with constrained, embedded software. Further, a logical virtual device 134 may be configured similarly to the virtual proxy devices 134*a*, 134*b* discussed above.

According to an example embodiment, the enterprise service proxy 130 may provide access to enterprise services to shop floor devices (e.g., devices 310*a*, 310*b*, 310*c*, 310*d*) via the Devices Profile for Web Services (DPWS) standard. According to an example embodiment, the enterprise service proxy 130 may provide the access to enterprise services not only to DPWS enabled devices, but also to devices associated with heterogeneous hardware platforms.

According to an example embodiment, the logical virtual device 134 may be provided to enable the use of enterprise services by these devices, as many shop floor devices have an ability to communicate only with other devices that communicate via the same protocol as the shop floor device.

Therefore, the example enterprise service proxy 130 may be configured to handle a multitude of protocols that may be available, for example, in an industrial environment. The protocols may also restrict access that a set of devices may have to certain services. Hence, the example enterprise service proxy 130 may be configured to provide:

- Interaction as one of the constrained devices downwards
- Interaction as a regular service client upwards
- Mediation between the realms of the backend and the devices, establishing logical links
- Manipulation of service invocation parameters:
  - Reduction of parameter count
  - Marshalling, unmarshalling of data
- Enforcement of Security:
  - Only a subset of enterprise services may be made available
  - Access to services may be limited
  - Mediation between the security concepts on the device level and the security concepts of the high-level (e.g., backend) services Thus, as shown in FIG. 3 (similarly as discussed above), the enterprise service proxy 130 may provide a logical/virtual link between the device layer 108 and the enterprise services available via the enterprise backend 106.

Figure 4:
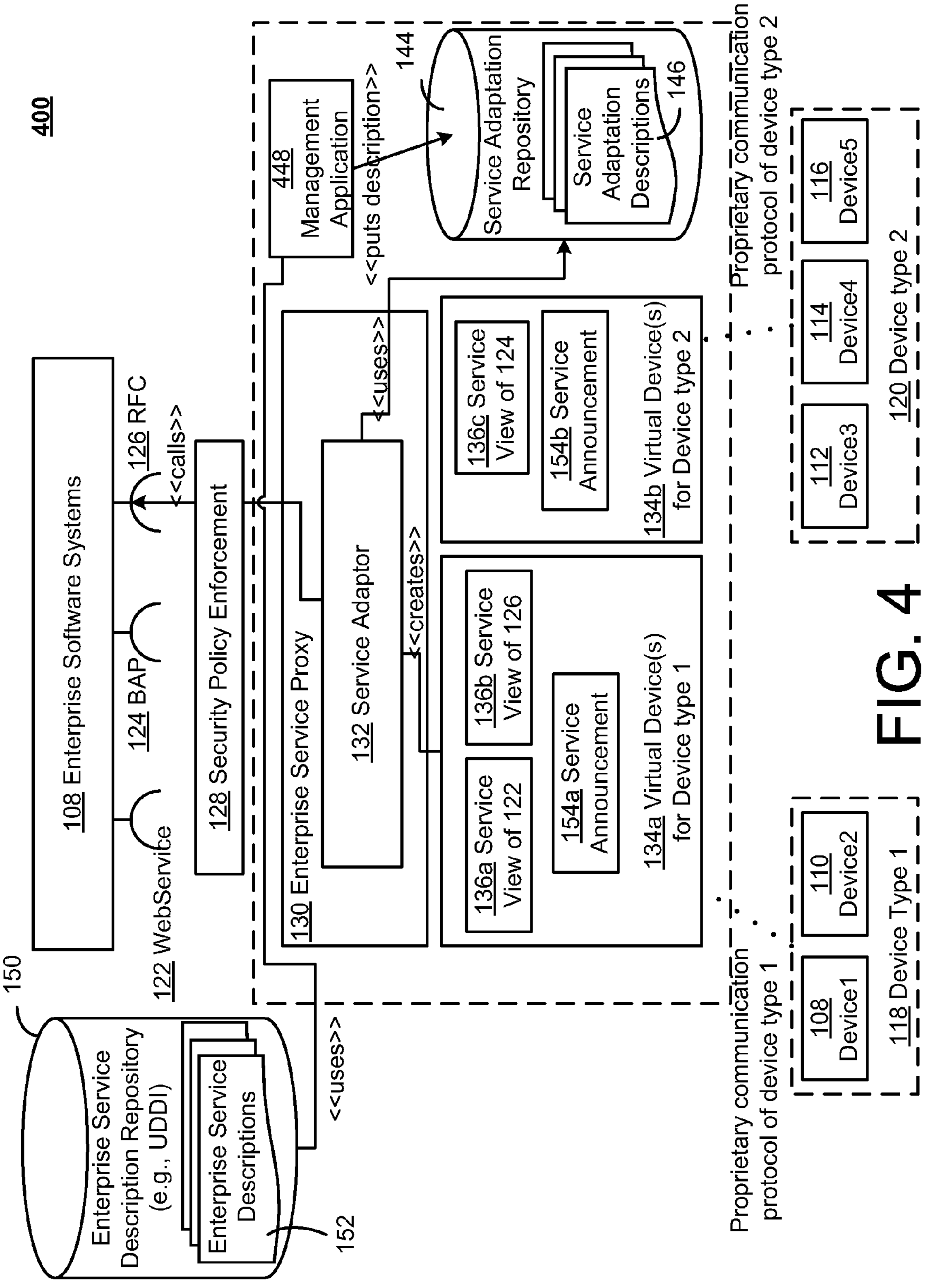
FIG. 4 depicts a system for mediating enterprise service access for smart devices according to an example embodiment.

FIG. 4 depicts a system 400 for mediating enterprise service access for smart devices according to an example embodiment. The diagram blocks are numbered to indicate system components similar to the components discussed above with regard to FIG. 1. For example, the enterprise software systems 108 may be configured similarly to the enterprise software systems 108 discussed above.

According to an example embodiment, the enterprise software systems 108 may be located on the backend device 106, and may provide services, which may be accessed, for example, via industry standard communication protocols such as RFCs 126, BAPIs 124 and web services 122. According to an example embodiment, the enterprise service repository 150 may be located at the backend device 106, and may include information associated with accessing available enterprise services.

According to an example embodiment, the service adaption descriptions 146 may be created to provide access to enterprise services by smart devices. According to an example embodiment, the service adaption descriptions 146 may be created via a management tool (e.g., management application 448, similar to the description manager 148) which may be configured to access the enterprise service repository 150 to retrieve service information. The service adaptation descriptions 146 generated with this tool may include information for use in generating a presentation of the enterprise service to low level devices. According to an example embodiment, the information may include:

- Access control policies
- Proprietary protocol mapping rules
- Service mapping parameters
- Connection type (e.g., web services, BAPIs, RFC, etc.)
- Service end-points
- Parameter reduction mapping
- Default values or calculation formulas for omitted parameters
- Error Compensation strategy
- Policies for handling unsuccessful invocations According to an example embodiment, based on the information provided by the service adaptation descriptions 146, the service adaptor component 132 may create the service views 136*a*, 136*b*, 136*c*, 136*d* inside the proxy virtual devices 134*a*, 134*b*, respectively. According to an example embodiment, for each device type 118, 120, one service view template may be provided (e.g., as program source code), and may be included in the service adaptation descriptions 146 for use by the service adaptor 132 in generating the service views 136*a*, 136*b*, 136*c*, 136*d*. Thus, representations of the backend services may be provided via the enterprise service proxy device 130. According to an example embodiment, the proxy virtual devices 134*a*, 134*b* may be generated and revised dynamically.

According to an example embodiment, the generated service views 136*a*, 136*b*, 136*c*, 136*d* may be configured to perform conversions between proprietary protocols and a protocol supported by the service adaptor 132.

According to an example embodiment, when devices request access to certain enterprise services, the request may be parsed by one or more of the service views 136*a*, 136*b*, 136*c*, 136*d* and forwarded to the service adaptor 132. According to an example embodiment, the service adaptor 132 may then request verification of the access rules (e.g., via the security policy enforcement device 128) and forward the request to the appropriate enterprise service (e.g., via a protocol 122, 124, or 126).

According to an example embodiment, if one or more of the device types 118, 120 supports a discovery mechanism, the service announcement 154*a*, 154*b* may be provided for each virtual device. According to an example embodiment, the service announcement 154*a*, 154*b* may announce the available services to shop floor devices, for example, during a discovery phase.

According to an example embodiment, the service adaptor 132 may extract the protocol conversion rules specified in a service adaptation description 146 and compile a service view 136*a*, 136*b*, 136*c* and a virtual device 134 (if not yet present). According to an example embodiment, service views may be generated based on pre-existing stubs that connect backend protocols with parser classes. These classes may be generated during compilation time and may generate the mapping rules as defined in the service adaptation descriptions 146. Additionally, based on the service adaptation description 146 a mediating receiver 138*a*, 138*b*, 138*c* may also be generated to provide communication with smart devices.

According to an example embodiment, the virtual device 134 may be deployed to a platform such as Open Services Gateway initiative (OSGi), which provides remote management of Java-based services. Virtual devices 134 based on OSGi techniques may be created and removed according to an application's needs. According to an example embodiment, service views 136*a*, 136*b*, 136*c* may also be deployed to OSGi containers when they are generated in the form of bundles.

According to an example embodiment, all service views 136*a*, 136*b*, 136*c* may be deployed to an OSGi bundle including the service announcement 154. Such service views 136*a*, 136*b*, 136*c* may generate messages to inform the smart devices 108, 110, 112, 114, 116 that backend services are available for their use. The format of these messages may vary according to the low level protocol used by the smart devices 108, 110, 112, 114, 116. For example, WS-Discovery is a protocol that may provide a service announcement feature, and that may be used by Devices Profile for Web Services (DPWS) enabled devices. Other example protocols that may provide such an announcement feature include Universal Plug and Play (UPnP) and Bonjour. According to an example embodiment, if the low level protocol does not support announcement of services, this service may not be deployed to the virtual device 134.

FIGS. 5*a*-5*e* depict an example service adaptation description in accordance with an eXtensible Markup Language (XML) schema format. As discussed previously, service adaptation descriptions 146 may be configured to mediate between smart device requests and enterprise service requests. According to an example embodiment, service adaptation descriptions 146 may be formalized in the form of XML documents. FIGS. 5*a*-5*e* illustrate an example XML schema 500 of such a document. As shown in FIG. 5*a*, the schema is associated with a serviceAdaptationDescription element 502. As discussed above, the serviceAdaptationDescription element 502 may, for example, provide availability of a backend enterprise service (e.g., a web service) to an embedded device. For example, there may be one description per device that may include rules for providing a connection to one or more services.

As shown in FIG. 5*a*, the example serviceAdaptationDescription element 502 may include elements version 504, virtualDevices 506, and conversionRules 508. The current version 504 associated with the serviceAdaptationDescription element 502 may include elements for a value 510 and a compatibility 512. According to an example embodiment, a service adaptation description 146 may be associated with one virtual device 134, which may be associated with a set of attributes such as its device identifier 514 and its device type 516, as shown in FIG. 5*a*. The device type 516 may be associated with a low-level communication protocol (e.g., virtual com port, DPWS device, Representational state transfer (REST) web service, etc.) associated with the virtual device 134.

As shown in FIG. 5*a*, the example element serviceAdaptationDescription 502 may include 0 . . . n conversion rules 508, wherein each rule may be associated with an operation of the underlying service. According to an example embodiment, each conversion rule 508 may be associated with a target enterprise service 518, a target service operation 520, a virtual device ID 522, 0 . . . n parameter mapping rules 524, an access policy 526, and error compensation strategies 528.

According to an example embodiment, the target enterprise service 518 of the service adaptation serviceAdaptationDescription 502 may include a service ID 530 which may, for example, be associated with a service stored in an enterprise service repository, for example, associated with an ERP system. For example, the target service operation 520 may include an operation ID 532 that may be used to select a specific operation of a specified service.

According to an example embodiment, the virtual device ID 522 may indicate the virtual device that will host the adapted version of the service.

According to an example embodiment, the access policy 526 may indicate potential allowed uses by devices of the respective enterprise service, which may, for example, include a level of authentication 534 as well as a level of encryption 536.

According to an example embodiment, the error compensation strategies 528 may include one or more indicators of which low level activities 538 may be triggered based on error messages 540 coming from the backend after invoking a service.

According to an example embodiment, for each parameter of the respective backend service, there may be associated one parameter mapping rule 524, which may include a parameter ID 542 and a mapping strategy 544. For example, the mapping strategy 544 may include one or more default values 546 and local formulas 546, wherein the parameters may be omitted in the parameter list presented to the device. For example, if a default value 546 is indicated, the parameter may be omitted in the parameter list presented to the device and a default value may be sent to the backend device 106. For example, if a local formula 546 is indicated, the parameter may be omitted in the parameter list presented to the device and it may be replaced by a formula or equation indicating a calculation of the value of the parameter based on other parameter values sent from the device (e.g., 2*p1+p2, wherein p1 and p2 include parameter IDs).

According to an example embodiment, a remote formula 550 may indicate a calculation of the value of the parameter based on both local parameter names and remote services (e.g., based on calls to a web service). According to an example embodiment, a direct mappings element 552 may indicate a target parameter name 554 to which a device-level parameter name is mapped.

Figure 6:
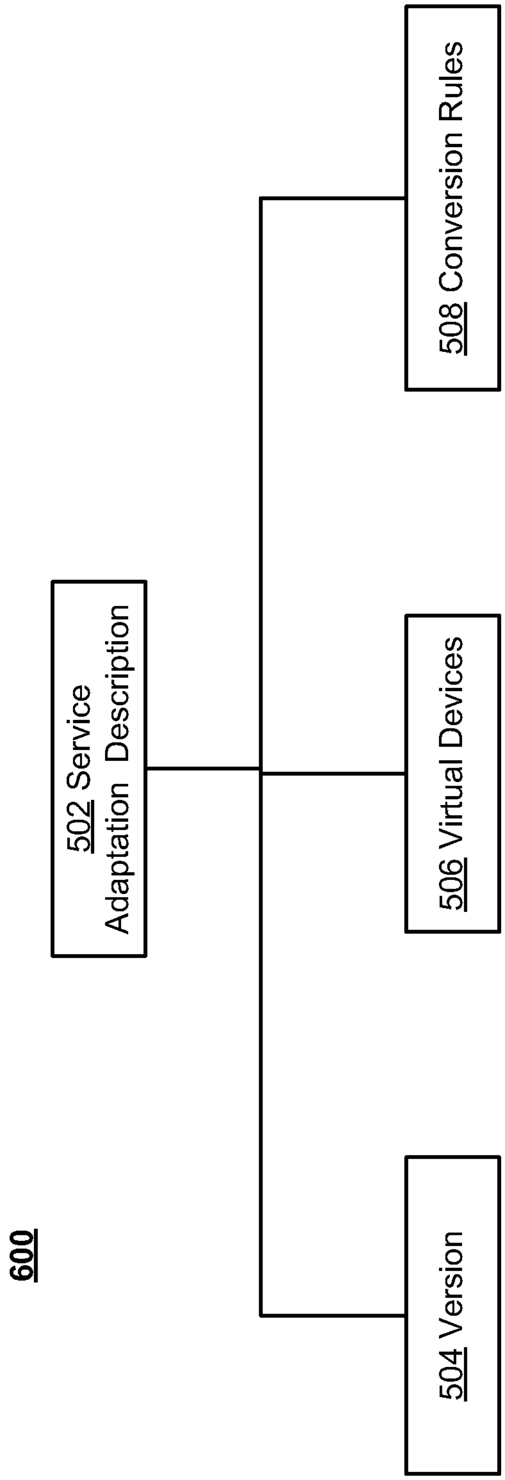
FIG. 6 is a block diagram of an example schema associated with a service adaptation description element of FIGS. 5*a*-5*e*.

FIG. 6 is a block diagram 600 of an example schema associated with the service adaptation description element 502 of FIGS. 5*a*-5*e*. As discussed above with regard to FIG. 5*a*, the example serviceAdaptationDescription element 502 may include elements version 504, virtualDevices 506, and conversionRules 508, as discussed further below.

Figure 7:
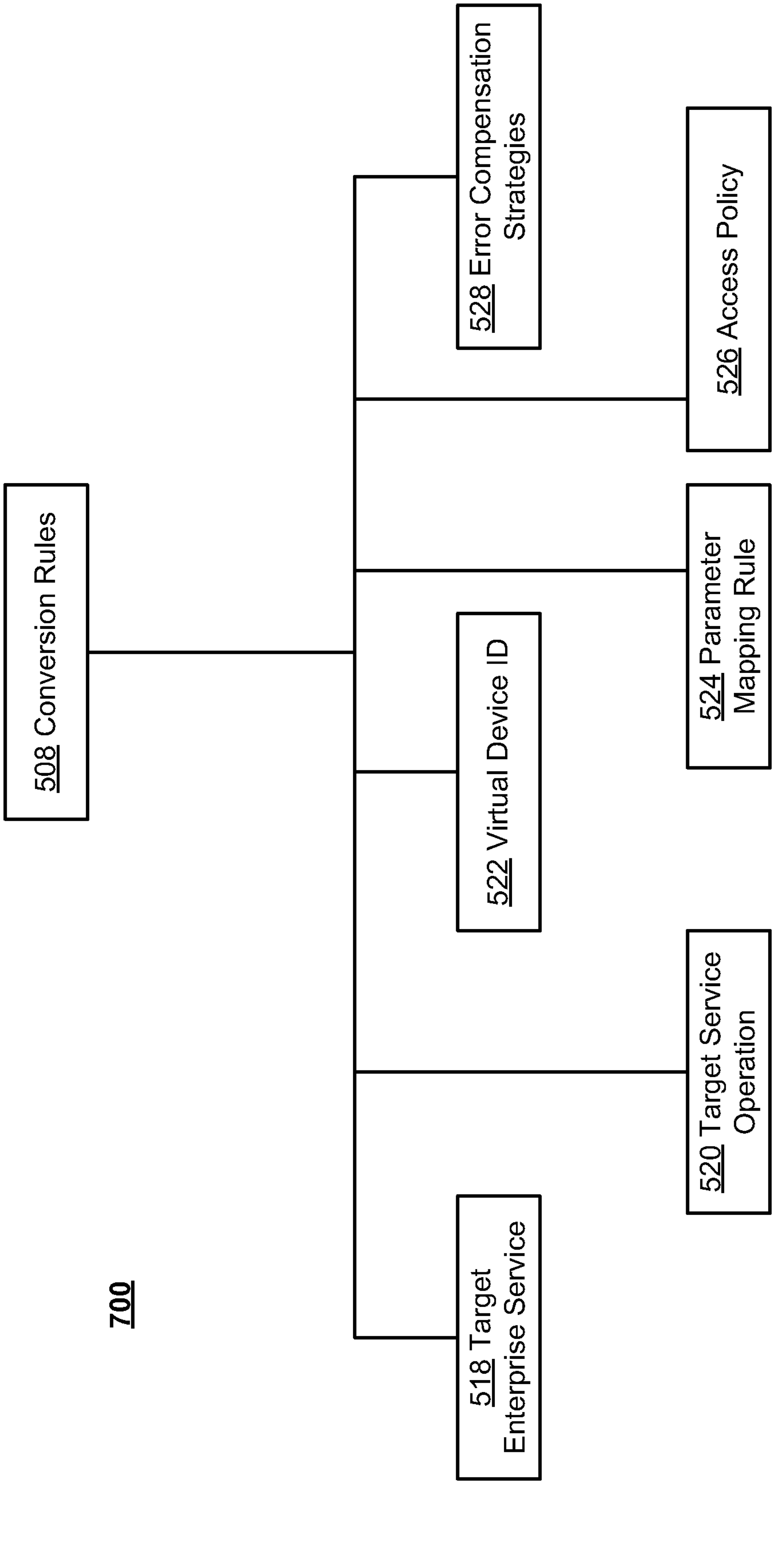
FIG. 7 is a block diagram of an example schema associated with a conversion rules element included in the service adaptation description of FIGS. 5*a*-5*e*.

FIG. 7 is a block diagram 700 of an example schema associated with a conversion rules element 508 included in the service adaptation description 502 of FIGS. 5*a*-5*e*. As discussed above with regard to FIGS. 5*a*-5*e*, the example conversionRules 508 may include elements target enterprise service 518, a target service operation 520, a virtual device ID 522, parameter mapping rules 524, an access policy 526, and error compensation strategies 528, as discussed further below.

FIGS. 8*a*-8*b* depict an example service adaptation description 802 in accordance with an XML format. The example shown in FIGS. 8*a*-8*b* is based on the RFID goods receipt scenario discussed above, in which a business may wish to track goods via RFID. For example, as RFID-tagged goods enter a warehouse, the RFID tags may be read by handheld terminals, and tag information may then be sent to an adaptation processor, which may match the tag ID and the receipt information. As discussed above, details of the receipt may be obtained based on this information, which may be sent to the backend device 106 for processing.

For example, an enterprise service may compare data associated with a goods receipt sent from an RFID gate with a shipment notification received in the backend (e.g., ERP) device 106 in order to ensure a correct delivery of goods. For example, the enterprise service may be configured to accept Electronic Product Codes (EPCS) of the received goods, an identifier associated with the RFID reader that read the tags of the goods, the shipment number, and a timestamp, as input parameters.

As shown in FIGS. 8*a*-8*b*, the example XML file indicates a conversion rule for a specific operation compareEPCwithShipment 804 of the enterprise service GoodsReceipt 806, which is associated with a virtual DPWS device associated with a device ID 10.24.98.103 (808). Respective example parameter mapping rules are associated with each of the four parameters discussed above. For example, a parameter mapping rule 810 indicates a direct mapping between an EPC of a received good and an EPC_enterprise parameter of the compareEPCwithShipment operation 804. The same direct mapping is indicated as being established by a parameter mapping rule 812 between a ReaderID and a ReaderID_enterprise parameter. With regard to the timestamp, a parameter mapping rule 814 indicates a default value (e.g., the current date) may be transmitted. In order to obtain the input parameter shipment number, a parameter mapping rule 816 indicates an invocation of a remoteFormula, as the information may not be locally available to the device.

Based on the goods receipt example, the following discussion focuses on interactions of various components of the example system 100 for providing an invocation of an enterprise service from a smart device. Information regarding the enterprise service GoodsReceipt 806 and its operation compareEPCwithShipment 804 discussed above may first be stored in the enterprise service description repository 150 as part of an enterprise service description 152. This description may also include one or more indications of any parameters associated with invoking the operation. The service adaptation description 802 discussed above may be generated based on the description of the compareEPCwithShipment 804 operation stored in the enterprise service description repository 150.

According to an example application scenario, a virtual DPWS device may encapsulate the enterprise operation compareEPCwithShipment 804. Thus, the service adaptor 132 may, for example, generate a service view 136*a* based on the operation compareEPCwithShipment 804, as part of a virtual device 134*a* for the device type DPWS. The service view 136*a* may include a parser 140*a*, a mediating converter 142*a*, and a mediating receiver 138*a*. Since DPWS also supports a discovery mechanism (i.e., WS-Discovery), a service announcement engine 154*a* may be generated as well.

If an RFID reader wishes to invoke the backend operation compareEPCwithShipment 804, the RFID reader may first discover the operation based on the service announcement 154*a* and may then invoke the service, similarly to invoking any other device-level service, on the virtual device 134*a*. The mediating receiver 138*a* associated with the virtual device 134*a* may receive the invocation of compareEPCwithShipment 804 via the DPWS-specific protocol. The parser 140*a* associated with the virtual device 134*a* may then parse the compareEPCwithShipment operation 804 to verify that it refers to a valid enterprise service. The mediating converter 142*a* may then map the device-level service invocation to the enterprise-level operation compareEPCwithShipment 804 associated with the enterprise service GoodsReceipt 806, based on the service adaptation description and its conversion rules.

According to an example embodiment, a shop floor may include a base of devices operating in an automated domain. According to an example embodiment, embedded devices may include smart devices and/or smart items.

The example techniques described herein may be implemented in a variety of settings. For example, the techniques may be used in an automation domain or in an energy distribution domain.

For example, in an automation domain, a robotic arm may be provided with one or more smart devices. The robotic arm may be controlled and/or monitored via smart devices accessing enterprise services via a backend server. A temperature sensor may also be monitoring an environment close to the robotic arm. It may be desirable for enterprise services to detect an unacceptable high temperature and control the shutdown of the robotic arm.

For example, in an energy distribution domain, a usage of electricity may be monitored at a backend server via smart devices operating in individual households. If the backend server determines that the usage has risen to a level that may predict an impending blackout, the backend server may control shutting down various household appliances to avoid the blackout. As another example, the backend server may determine that various household appliances may be activated or de-activated at certain times (e.g., to obtain an optimal rate during certain hours of the day, to optimize energy usage when a homeowner is gone on vacation, etc.).

As another example, fusion deposition modeling (FDM) is a technique which may be used for performing Rapid Prototyping (RP), for example, in production industries. For example, a car manufacturer may extend FDM into other areas and functions such as direct digital manufacturing, in which machines may have a large bandwidth in the types of products manufactured. These products may vary in shape, size, material and techniques for production (e.g., heating, milling, drilling, etc), which may all be executed on one multipurpose machine. Such multi-purpose production machines may not have a standard associated with the information they need for executing the techniques for production. For example, input may vary depending on the type of product being produced. For example, web services may be deployed on these machines to obtain the product details from different sources. Such web service may use middleware, as discussed above, which may organize the services between the design platform and the execution environment.

As another example, automation machines operating on a shop floor may include a variety of electronics which control the process and execution of production on the electromechanical components of the machines. These electronics may be resource constrained and thus may not be able to accommodate certain features such as diagnostic algorithms for the whole set of operations that may need substantially more resources (e.g., computational resources, memory, etc). For example, the sequence of production may change for another product to be produced on the same machine, which may make it desirable to alter these diagnostic algorithms as well. By using the example techniques discussed herein, the diagnostic routines may be stored remotely and the machines may run the diagnosis periodically. Thus, the diagnostic algorithms may be updated on the back end machines (e.g., the backend device 106). For example, two similar machines may need different algorithms (e.g., two robotic arms), or two different machines may need the same algorithms (e.g., a conveyor controller and a fork-lifter may need algorithms to determine the temperature and speed of motors). For example, web services may aid in maintaining atomicity for orchestrating which algorithm to run on which machine. The example middleware architecture discussed herein may provide an orchestration of web services for the diagnostic routines and the machines on the shop floor. Further, the example middleware architecture discussed herein may also be used to integrate Enterprise Resource Planning (ERP) systems to place an order or alert personnel to a potentially defective spare part, and may also enhance predictive maintenance.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A system comprising:

an enterprise service access mediator including:

an enterprise service proxy including:

a service adaptor configured to compile a first virtual proxy device for smart devices of a first type and a second virtual proxy device for smart devices of a second type based on enterprise service descriptions, each of the first virtual proxy device and the second virtual proxy device including one or more service view engines, each service view engine supporting communication exchanges between the smart devices and at least one enterprise service located at a backend device via a different interface, at least one service view engine including:

a mediating receiver configured to receive a first message from a smart device of a first type via a first protocol associated with the smart device of the first type by emulating another smart device of the first type;

a parser configured to determine that the first message includes a smart device request for processing via the at least one enterprise service located at the backend device; and a mediating converter configured to determine an enterprise service request and an associated enterprise request protocol based on a service adaptation description associated with the first virtual proxy device including translating the smart device request to obtain the enterprise service request based on:

a mapping of the first protocol to the associated enterprise request protocol included in the service adaptation description, interface type associated with the at least one service view engine, a mapping of parameters from the smart device of the first device to parameters of the associated enterprise service included in the service adaptation description, and access control policies included in the service adaptation description; and the service adaptor configured to send the enterprise service request to the backend device via the associated enterprise request protocol.

2. The system of claim 1, wherein:

the enterprise service access mediator includes a service adaptation repository configured to store service adaptation descriptions, and the service adaptor is configured to obtain one or more protocol conversion rules based on the service adaptation descriptions and to compile the first and second virtual proxy devices and the service view engines based on the more protocol conversion rules and the service adaptation descriptions.

3. The system of claim 1, further comprising:

an enterprise service description repository configured to store the enterprise service descriptions, including information describing enterprise services associated with the backend device, wherein the backend device includes one or more backend servers, wherein the enterprise service access mediator includes a description manager configured to generate the service adaptation descriptions based on the enterprise service descriptions, wherein the service adaptation descriptions include information associated with conversion between messages associated with the first protocol and messages associated with the at least one enterprise service.

4. The system of claim 1, wherein the first protocol includes a proprietary protocol associated with the smart device of the first type.

5. The system of claim 1, wherein the virtual proxy device includes:

a service announcement engine configured to send an availability message to the smart device of the first type or the second type indicating an availability of an enterprise service for mediated access by the smart device of the first type or the second type when the enterprise service is newly added to the first virtual proxy device or the second virtual proxy device.

6. The system of claim 1, wherein the mapping includes:

an eXtensible Markup Language (XML) mapping that includes an indication of a first term associated with the smart device request and an indication of a second term associated with the enterprise service request via translation from the smart device request to the enterprise service request.

7. The system of claim 1, wherein:

the mediating converter is configured to determine the enterprise service request based on obtaining at least one parameter associated with the enterprise service request based on the service adaptation description associated with the enterprise service and the first protocol.

8. The system of claim 1, wherein:

the smart device includes one or more of an embedded device, a radio frequency identification (RFID) reader, an RFID-tagged item, a smart items device, a device within a sensor network, a sensor mote, a product embedded information device, a shop floor device, a personal digital assistant (PDA), a personal computer, a portable computer, a wireless telephone, a power regulation device, a monitoring device, a production machine, a smart power meter, a wireless sensor node, a programmable logic controller, a telephone, a vehicle, a robot, a mobile phone, or a product control device.

9. A method comprising:

compiling, by a service adaptor, a first virtual proxy device for smart devices of a first type and a second virtual proxy device for smart devices of a second type based on enterprise service descriptions, each of the first virtual proxy device and the second virtual proxy device including one or more service view engines, each service view engine supporting communication exchanges between the smart devices and at least one enterprise service located at a backend device via a different interface;

receiving, by at least one service view engine, a first message from a smart device of a first type via a first protocol associated with the smart device of the first type by emulating another smart device of the first type;

determining that the first message includes a smart device request for processing via the at least one enterprise service located at the backend device;

determining an enterprise service request and an associated enterprise request protocol based on a service adaption description associated with the first virtual proxy device including translating the smart device request to obtain the enterprise service request based on:

a mapping of the first protocol to the associated enterprise request protocol included in the service adaptation description, interface type associated with the at least one service view engine, a mapping of parameters from the smart device of the first device to parameters of the associated enterprise service included in the service adaptation description, and access control policies included in the service adaptation description; and sending the enterprise service request to the backend device via the associated enterprise request protocol.

10. The method of claim 9, wherein the first protocol includes a proprietary protocol associated with the smart device of the first type.

11. The method of claim 9, wherein:

determining that the first message includes a smart device request includes parsing the first message, by the at least one service view engine, to obtain the smart device request for processing via the at least one enterprise service located at the backend device, wherein the backend device includes one or more backend servers.

12. The method of claim 9, wherein:

determining the enterprise service request includes translating the smart device request to obtain the enterprise service request based on an eXtensible Markup Language (XML) mapping included in the service adaptation description associated with the enterprise service and the first protocol, wherein the XML mapping includes an indication of a first term associated with the smart device request and an indication of a second term associated with the enterprise service request via translation from the smart device request to the enterprise service request.

13. The method of claim 9, wherein:

determining the enterprise service request includes obtaining at least one parameter associated with the enterprise service request based on the service adaptation description associated with the enterprise service and the first protocol.

14. The method of claim 9, wherein:

sending the enterprise service request to the backend device includes sending the enterprise service request to a backend device interface based on the associated enterprise request protocol.

15. The method of claim 9, wherein:

the associated enterprise request protocol includes one or more of a web service interface, a Business Application Programming Interface (BAPI), or a Remote Function Call (RFC) interface.

16. The method of claim 9, wherein:

the smart device includes one or more of an embedded device, a radio frequency identification (RFID) reader, an RFID-tagged item, a smart items device, a device within a sensor network, a sensor mote, a product embedded information device, a shop floor device, a personal digital assistant (PDA), a personal computer, a portable computer, a wireless telephone, a power regulation device, a monitoring device, a production machine, a smart power meter, a wireless sensor node, a programmable logic controller, a telephone, a vehicle, a robot, a mobile phone, or a product control device.

17. The method of claim 9, further comprising:

receiving a response message from the backend device via the enterprise request protocol;

determining a smart device response based on the response message and the service adaptation description; and sending a second message including the smart device response from the enterprise service proxy device to the smart device via the first protocol.

18. The method of claim 9, wherein:

sending the enterprise service request to the backend device via the associated enterprise request protocol includes verifying a permission to access the enterprise service based on the service adaptation description associated with the enterprise service and the first protocol.

19. A computer program product being tangibly embodied on a non-transitory computer-readable medium and being configured to cause a data processing apparatus to:

compile at a service adaptor a first virtual proxy device for smart devices of a first type and a second virtual proxy device for smart devices of a second type based on enterprise service descriptions, each of the first virtual proxy device and the second virtual proxy device including one or more service view engines, each service view engine supporting communication exchanges between the smart devices and at least one enterprise service located at a backend device via a different interface;

receive at a service view engine a first message from a smart device of the first type via a first protocol associated with the smart device of the first type by emulating another smart device of the first type;

determine that the first message includes a smart device request for processing via the at least one enterprise service located at the backend device;

determine an enterprise service request and an associated enterprise request protocol based on translating the smart device request to obtain the enterprise service request based on:

a mapping of the first protocol to the associated enterprise request protocol included in a service adaptation description, interface type associated with the at least one service view engine, a mapping of parameters from the smart device to parameters of the associated enterprise service included in the service adaptation description, the parameters of the associated enterprise service including at least a service identification (ID) associated with a type of enterprise service and an operation ID associated with a type of operation of the enterprise service, and access control policies included in the service adaptation description; and send the enterprise service request to the backend device via the associated enterprise request protocol.

* * * * *